(12) United States Patent   (10) Patent No.: US 7,623,856 B2
Azuma   (45) Date of Patent: Nov. 24, 2009

(54) METHOD FOR TESTING COMMUNICATION PROTOCOL HAVING COLLECTION OF INTERNAL INFORMATION OF A MOBILE COMMUNICATION TERMINAL BY AN EXTERNAL MODULE

(75) Inventor: Hiroyuki Azuma, Kanagawa (JP)

(73) Assignee: NEC Electronics Corporation (JP)

( * ) Notice: Subject to any disclaimer, the term of this patent is extended or adjusted under 35 U.S.C. 154(b) by 442 days.

(21) Appl. No.: 10/632,749

(22) Filed: Aug. 1, 2003

(65) Prior Publication Data

US 2004/0033814 A1    Feb. 19, 2004

(30) Foreign Application Priority Data

Aug. 13, 2002    (JP)    ............................... 2002-235941

(51) Int. Cl.
*H04W 24/00*    (2009.01)

(52) U.S. Cl. ...................................... 455/425; 455/558

(58) Field of Classification Search ................. 455/425, 455/558, 67.11, 556.1
See application file for complete search history.

(56) References Cited

U.S. PATENT DOCUMENTS

| 5,404,580 | A  | * | 4/1995 | Simpson et al. | ............. | 455/558 |
| 5,418,837 | A  | * | 5/1995 | Johansson et al. | ........... | 455/558 |
| 6,430,410 | B1 | * | 8/2002 | Staber | ......................... | 455/423 |
| 6,697,604 | B1 | * | 2/2004 | Rimpela et al. | .......... | 455/67.14 |
| 6,792,406 | B1 |   | 9/2004 | Fujimura et al. | ............ | 704/257 |
| 7,209,737 | B2 |   | 4/2007 | Cho | ........................... | 455/425 |

FOREIGN PATENT DOCUMENTS

| CN | 1455617 | 4/2002 |
| DE | 196 20 164 | 7/1997 |
| EP | 0 973 348 | 1/2000 |
| JP | 9-84101 | 3/1997 |
| JP | 9-219697 | 8/1997 |
| JP | 11-175668 | 7/1999 |
| JP | 11-186974 | 7/1999 |
| JP | 11-331405 | 11/1999 |
| JP | 2000-032545 | 1/2000 |
| JP | 2000-049687 | 2/2000 |
| JP | 2000-187435 | 7/2000 |
| JP | 2000-259989 | 9/2000 |
| JP | 2000-324042 | 11/2000 |
| JP | 2001-230725 | 8/2001 |
| JP | 2001-238260 | 8/2001 |
| JP | 2002-091770 | 3/2002 |
| WO | WO 00/51380 | 8/2000 |
| WO | WO 02/069656 | 9/2002 |

OTHER PUBLICATIONS

German Official Action and English Translation, dated May 27, 2009; (8 pgs).

* cited by examiner

*Primary Examiner*—Philip J Sobutka
(74) *Attorney, Agent, or Firm*—Hayes Soloway P.C.

(57) ABSTRACT

An external module and a mobile communication terminal that facilitate collection of the internal state of a mobile communication terminal are provided. The external module is installed in the mobile communication terminal when the mobile communication terminal is in use and comprises: an internal information collection unit that communicates with the mobile communication terminal for collecting information relating to the internal states of the mobile communication terminal; and a memory for storing information that has been collected by the internal information collection unit. The mobile communication terminal has an internal state information acquisition unit for acquiring internal state information of the mobile communication terminal and supplying this internal state information to the external module.

19 Claims, 7 Drawing Sheets

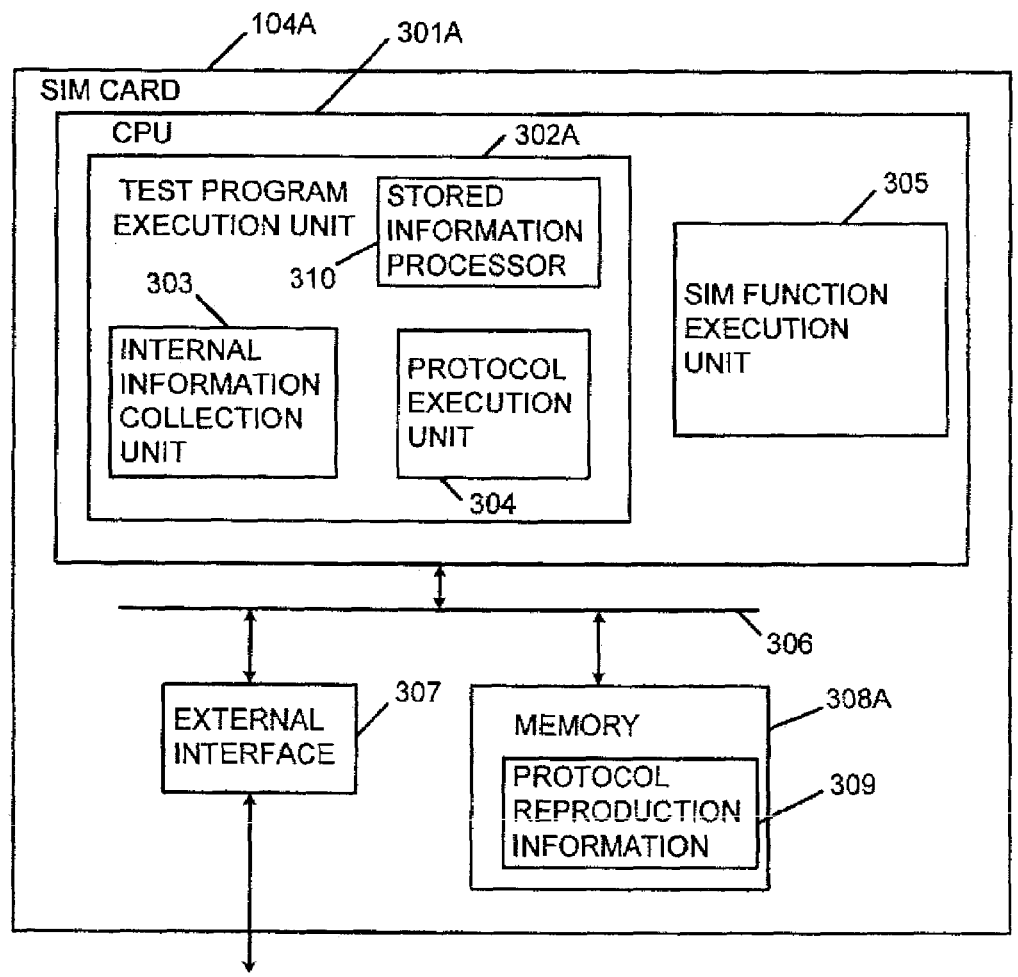

METHOD FOR TESTING COMMUNICATION PROTOCOL HAVING COLLECTION OF INTERNAL INFORMATION OF A MOBILE COMMUNICATION TERMINAL BY AN EXTERNAL MODULE

BACKGROUND OF THE INVENTION

1. Field of the Invention

The present invention relates to a mobile communication terminal such as a portable telephone terminal.

2. Description of the Related Art

In the prior art, portable telephone terminals that are connected to a radio communication network and communicate information have included devices that are used by connecting to an external storage device (hereinafter referred to as portable storage device). The portable storage device stores information such as identification information and billing information relating to the user of the portable telephone terminal, which is used to connect the portable telephone terminal to the radio communication network.

Radio communication networks that are used by portable telephone terminals that use a portable storage device include GSM (Global Systems for Mobile communications) or DCS (Digital Communication Services) 1800 which are the digital mobile communication standards in Europe, and PCS (Personal Communications Services) 1900, which is the digital portable telephone standard in North America. In these modes, GSM uses the 800 MHz frequency bandwidth, DCS 1800 uses the 1800 MHz frequency bandwidth, and PCS 1900 uses the 1900 MHz frequency bandwidth.

In these different radio communication networks, communication is performed using substantially the same protocol. Thus, information for setting the communication protocol that relates to the radio communication network used in portable telephone terminals is stored in the portable storage device, and the portable telephone terminal is then connected to the radio communication network. Portable storage devices that are in current use include IC cards such as SIM (Subscriber Identity Module) cards and USIM (Universal Subscriber Identity Module) cards. IC cards such as SIM cards and USIM cards can be inserted into or removed from an interface that is provided in a portable telephone terminal. In addition, services that employ the functions of an SAT (SIM Application Toolkit) or USAT (USIM Application Toolkit) of the 3GPP standard are being developed for portable telephone terminals in which this type of SIM card or USIM card can be installed.

When developing a portable telephone terminal, tests are carried out to determine whether the protocol being used in communication is operating normally. Such tests include, for example, indoor tests for testing a portable telephone terminal inside a room such as a laboratory and field tests for testing a portable telephone terminal outdoors using an actual base station. Field tests are carried out after first determining through indoor tests that a portable telephone terminal operates normally.

In a field test of the communication protocol that is used in portable telephone terminal communication, portable telephone terminal 1103 performs communication such as call origination, connection, and conversation with base station 1101 by way of radio interface 1102 as shown in FIG. 1. At this time, SIM card 1104 is inserted into portable telephone terminal 1103, and communication with base station 1101 is carried out.

Protocol simulation tests or acquisition of internal information relating to the internal operation of portable telephone terminal 1103 in field tests is carried out by software on personal computer 1105 (hereinbelow abbreviated as PC 1105), which is the test equipment. This PC 1105 is further provided with internal information acquisition means 1105a for acquiring internal information of portable telephone terminal 1103 and protocol simulation test means 1105b for performing a protocol simulation test by reproducing the field test based on this internal information.

In a field test, the tester uses PC 1105 to set portable telephone terminal 1103 to the test mode, whereupon communication protocol is transmitted to base station 1101 by way of portable telephone terminal 1103. At this time, SIM card 1104 is installed in portable telephone terminal 1103 to allow communication between portable telephone terminal 1103 and base station 1101.

With the transmission of communication protocol, a communication protocol sequence is generated between portable telephone terminal 1103 and base station 1101 during actual communication. This communication protocol sequence is transmitted to PC 1105 by way of portable telephone terminal 1103. PC 1105 acquires internal information of portable telephone terminal 1103 by means of internal information acquisition means 1105a and stores this communication protocol sequence as internal information in a storage device.

When PC 1105 has completed the storage of the communication protocol sequence, the reproduction test in the field test is carried out. In the reproduction test, a communication protocol sequence that is communicated between portable telephone terminal 1103 and base station 1101 during actual communication as already described is artificially generated on PC 1105.

The protocol reproduction test is performed by protocol simulation test means 1105b of PC 1105, and the actual communication protocol that was communicated between base station 1101 and portable telephone terminal 1103 is reproduced. With this protocol reproduction test on PC 1105, a tester can examine an actual communication protocol sequence and investigate problem points and points for improvement. If the tester discovers a problem point or point for improvement, the tester takes portable telephone terminal 1103 back to the laboratory and modifies or improves the communication protocol.

FIG. 2 shows the internal configuration of portable telephone terminal 1103 of the prior art. In portable telephone terminal 1103 of the prior art, internal CPU 1201 communicates with radio interface 1102 by way of radio unit 1210 and baseband signal processor 1209. Communication is then on CPU 1201 between logical bus 1207 and baseband signal processor 1209 by way of communication protocol stack 1208. In addition, communication protocol stack 1208 and TE (Terminal Equipment) 1203 and 1205 communicate by way of logical bus 1207 inside CPU 1201. Further, TE 1203 and 1205 perform protocol conversion by means of TAF (Terminal Adaptation Functions) 1204 and 1206 to communicate with communication protocol stack 1208.

As shown in FIG. 2, communication is performed between communication protocol stack 1208 and SIM card 1104 that is installed in portable telephone terminal 1103 by way of logical bus 1207. Upon being installed in portable telephone terminal 1103, SIM card 1104 is connected to UIMF (User Identity Module Function) 1202. SIM card 1104 then communicates with logical bus 1207 by way of UIMF 1202 and exchanges subscriber information or user information that is stored in SIM card 1104 with communication protocol stack 1208 or another block.

Logical bus 1207 is also able to communicate with external interface 1211 of portable telephone terminal 1103, whereby SIM card 1104 can receive and store subscriber information or user information from external interface 1211.

When carrying out a field test, portable telephone terminal 1103 also receives instructions relating to the field test from PC 1105 by way of external interface 1211, whereby the start and end of a field test or the acquisition of information on portable telephone terminal 1103 are executed to carry out desired tests. The internal information of portable telephone terminal 1103 is acquired by internal information acquisition means 1105a of PC 1105 and stored in PC 1105. When carrying out a protocol reproduction test, the reproduction test is executed on PC 1105 by means of protocol simulation test means 1105b based on the internal information of portable telephone terminal 1103 that has been stored in PC 1105.

FIG. 3 shows an example of the internal configuration of SIM card 1104. SIM card 1104 includes CPU 1301, internal bus 1306, external interface 1307, and memory 1308. CPU 1301 includes SIM function execution unit 1305. SIM function execution unit 1305 communicates with external interface 1307 by way of internal bus 1306 and transfers subscriber information and user information that have been stored in memory 1308 to portable telephone terminal 1103 based on instructions from portable telephone terminal 1103. SIM function execution unit 1305 further stores data that have been received from portable telephone terminal 1103 in memory 1308.

As previously explained, a field test of the prior art requires dedicated equipment (for example, a personal computer or test software) for acquiring internal information of a portable telephone terminal and for protocol simulation tests. As a result, the field test method of the prior art, while excelling in test flexibility and visibility, has the problems of poor maneuverability and portability. Although test functions can be provided inside the portable telephone terminal (software and hardware), there is a limit on resources such as memory, and as a result, only extremely limited and simple test functions can be realized.

Further, the test equipment that is used in field tests is equipment that the service provider or manufacturer of the terminal uses in the development or maintenance of the terminal and is not made available to general users. As a result, a user is not able to obtain internal information in a real time fashion regarding a problem that occurs when the user is using the portable telephone terminal.

When analyzing a problem, the service provider or manufacturer of a terminal is forced to depend on guesswork or incomplete information from a user regarding the state of use, and a great deal of time and effort is necessary to reproduce a problem and investigate the source of a problem. Thus, problems that occur in a portable telephone terminal cannot be investigated efficiently and problems are difficult to solve quickly, and therefore, portable telephone terminals in which problems have occurred cannot be quickly repaired and returned to the user.

SUMMARY OF THE INVENTION

In view of the above-described problems, it is an object of the present invention to provide an external module, a mobile communication terminal, a mobile communication system, and a testing method that can facilitate the collection of information regarding the internal state of a mobile communication terminal.

According to one aspect of the present invention, an external module is installed in a mobile communication terminal when the mobile communication terminal is in use and includes: collection means that communicates with the mobile communication terminal to collect information relating to the internal state of the mobile communication terminal; and storage means for storing information that has been collected by the collection means. This arrangement facilitates the collection of information on the internal state of a mobile communication terminal.

According to an embodiment of the present invention, the external module further includes a protocol execution means for requesting a mobile communication terminal to execute a communication protocol sequence. This arrangement enables the efficient execution of a communication protocol sequence.

According to another embodiment of the present invention, the protocol execution means includes means for requesting the execution of a communication protocol sequence based on information that has been stored in the storage means. This arrangement enables the efficient execution of a communication protocol sequence based on information on the internal state of a mobile communication terminal.

According to another embodiment of the present invention, the communication protocol sequence is a communication protocol sequence that is performed by radio between the mobile communication terminal and a base station. This arrangement enables the efficient execution of a communication protocol sequence between the mobile communication terminal and a base station.

According to another embodiment of the present invention, the external module further includes a stored information processing means for processing information that has been stored in the storage means. This arrangement enables the convenient processing of internal state information for executing a communication protocol sequence.

According to another embodiment of the present invention, the protocol execution means includes means for requesting the execution of a communication protocol sequence based on information that has been processed by the stored information processing means. This arrangement enables the execution of a communication protocol sequence that has been processed.

According to another embodiment of the present invention, the external module is a SIM card, an USIM card, or an IC card of higher standards than these cards. This arrangement enables the addition of new functions in the SIM card or USIM card.

According to another mode of the present invention, a mobile communication terminal is a mobile communication terminal in which an external module is installed when in use and that includes an acquisition means for acquiring information relating to the internal state of the mobile communication terminal and output means for supplying information that has been acquired by the acquisition means to the external module. This arrangement facilitates the acquisition of information on the internal state of the mobile communication terminal.

According to another mode of the present invention, a mobile communication system includes a mobile communication terminal and an external module that is installed in the mobile communication terminal when the mobile communication terminal is in use; wherein the mobile communication terminal includes acquisition means for acquiring information relating to the internal state of the mobile communication terminal and output means for supplying information that has been acquired by the acquisition means to the external module; and wherein the external module includes collection means for collecting information that has been supplied from the output means of the mobile communication terminal and storage means for storing information that has been collected by the collection means. This arrangement facilitates the collection of information regarding the internal state of a mobile communication terminal.

According to another aspect of the present invention, a testing method for testing communication protocol on a mobile communication terminal in which an external module is installed when the mobile communication terminal is in use includes steps of: requesting, by the external module, execution of a communication protocol sequence by the mobile communication terminal; executing, by the mobile communication terminal, the communication protocol sequence in accordance with the request by the external module; acquiring, by the mobile communication terminal, information relating to the internal state; supplying, by the mobile communication terminal, the acquired internal state information to the external module; collecting, by the external module, the information that has been supplied by the mobile communication terminal; and storing, by the external module, the collected information. This method facilitates the collection of internal state information of the mobile communication terminal.

According to another embodiment of the present invention, the external module requests the execution of a communication protocol sequence based on information that has been stored. This arrangement enables the efficient execution of a communication protocol sequence based on information relating to the internal state of the mobile communication terminal.

According to another embodiment of the present invention, the mobile communication terminal executes a communication protocol sequence with a base station by radio. This arrangement enables the efficient execution of a communication protocol sequence between a mobile communication terminal and a base station.

According to another embodiment of the present invention, the testing method further includes a step of processing information that is stored in the external module. This arrangement enables convenient processing of a communication protocol sequence.

According to another embodiment of the present invention, the external module requests the execution of a communication protocol sequence based on internal state information that has been processed. This arrangement enables internal state information to be conveniently processed for executing a communication protocol sequence.

The above and other objects, features, and advantages of the present invention will become apparent from the following description with reference to the accompanying drawings, which illustrate examples of the present invention.

BRIEF DESCRIPTION OF THE DRAWINGS

FIG. 9 is a schematic diagram of another example of the internal construction of a SIM card in an embodiment of the present invention.

DETAILED DESCRIPTION OF THE PREFERRED EMBODIMENTS

The following is a description of a preferred embodiment of the present invention, a field test for testing the communication protocol of a mobile communication terminal in which a SIM card is installed; a portable telephone terminal is used as the mobile communication terminal and a SIM card is used as the external module.

A USIM card may also be used in place of a SIM card. The mobile communication terminal is not limited to a portable telephone terminal, but may be any mobile communication terminal in which an external module such as a SIM card or a USIM card can be installed. In addition, the external module is not limited to an IC card such as a SIM card or USIM card, but may also be an external module having a CPU and memory that can be installed in a portable terminal device.

Figure 1:
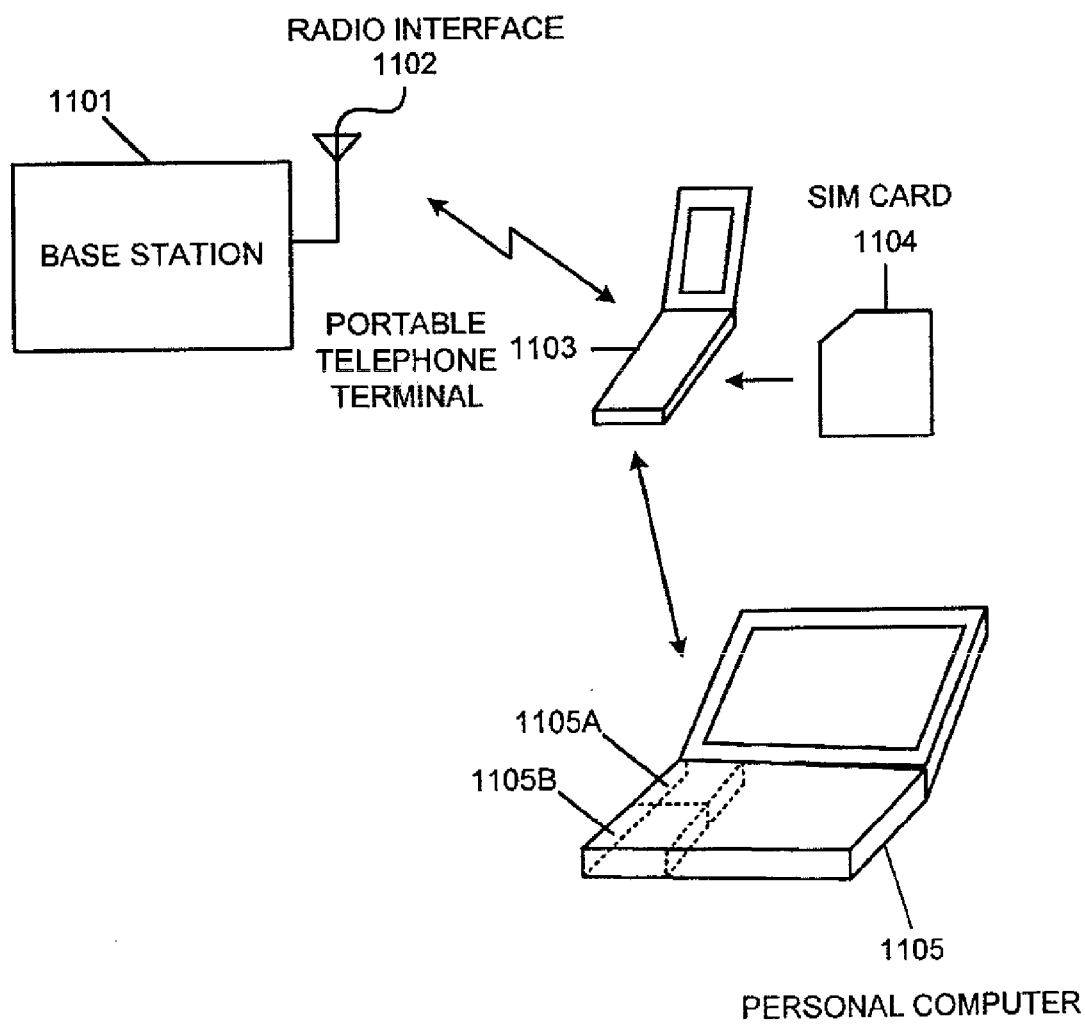
FIG. 1 shows a field test of the prior art.
Figure 2:
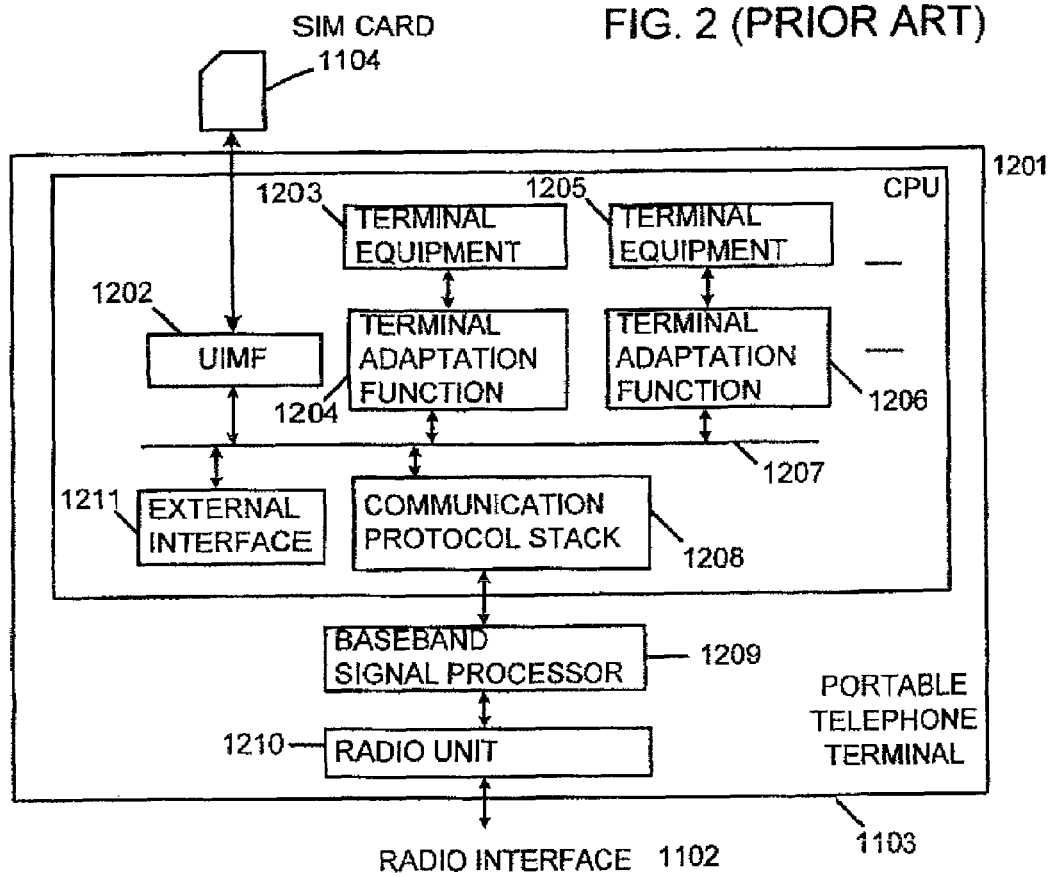
FIG. 2 is a block diagram showing a portable telephone terminal of the prior art.
Figure 3:
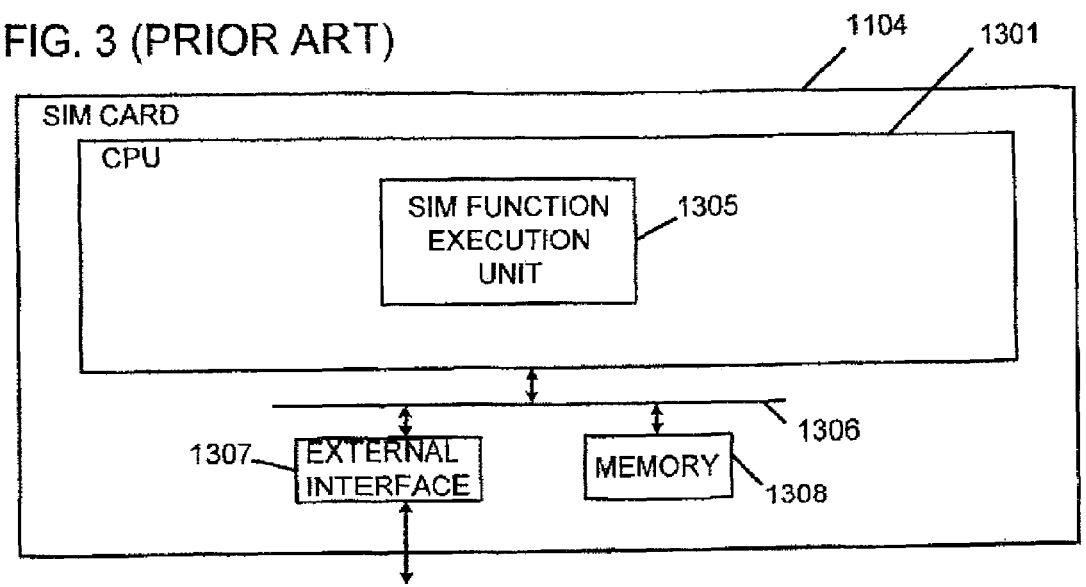
FIG. 3 is a block diagram showing a SIM card of the prior art.
Figure 4:
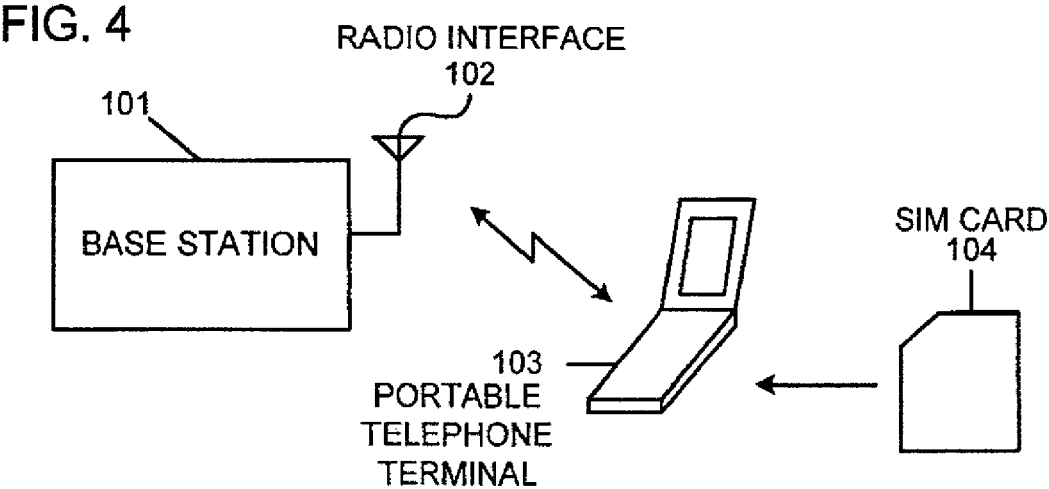
FIG. 4 is a block diagram showing a field test according to an embodiment of the present invention.

An explanation as to a field test and the configuration of the portable telephone terminal and SIM card for effecting this field test is first. As shown in FIG. 4, a field test is realized by performing call origination, connection, and conversation by portable telephone terminal 103 between portable telephone terminal 103 and base station 101 by way of radio interface 102.

Base station 101 is a conventional base station that is managed by a communication service provider. Portable telephone terminal 103 may be a device having a size and form that is similar to a portable telephone terminal of the prior art. Further, SIM card 104 may be a card having a size and form that is similar to a SIM card of the prior art.

One type of SIM card is a plug-in SIM card that accords with the GSM 11.11 specifications that is standard equipment in European GSM digital portable telephones. A SIM card that is standard equipment in this European GSM digital portable telephone and that is used for a subscriber's telephone number and personal identification can be used as SIM card 104. However, the external module in the present embodiment is not limited to a SIM card, but also allows the use of a USIM card that is packaged in the W-CDMA mode of the next-generation IMT 2000 mode.

Portable telephone terminal 103 is the object of testing in the field test, and testing is performed to determine whether the communication protocol sequence of portable telephone terminal 103 is executed according to design. When carrying out a field test, SIM card 104 is first installed in portable telephone terminal 103. As with typical SIM cards, SIM card 104 is inserted from the outside into the case of portable telephone terminal 103 or inserted from the battery removal opening of portable telephone terminal 103.

Figure 5:
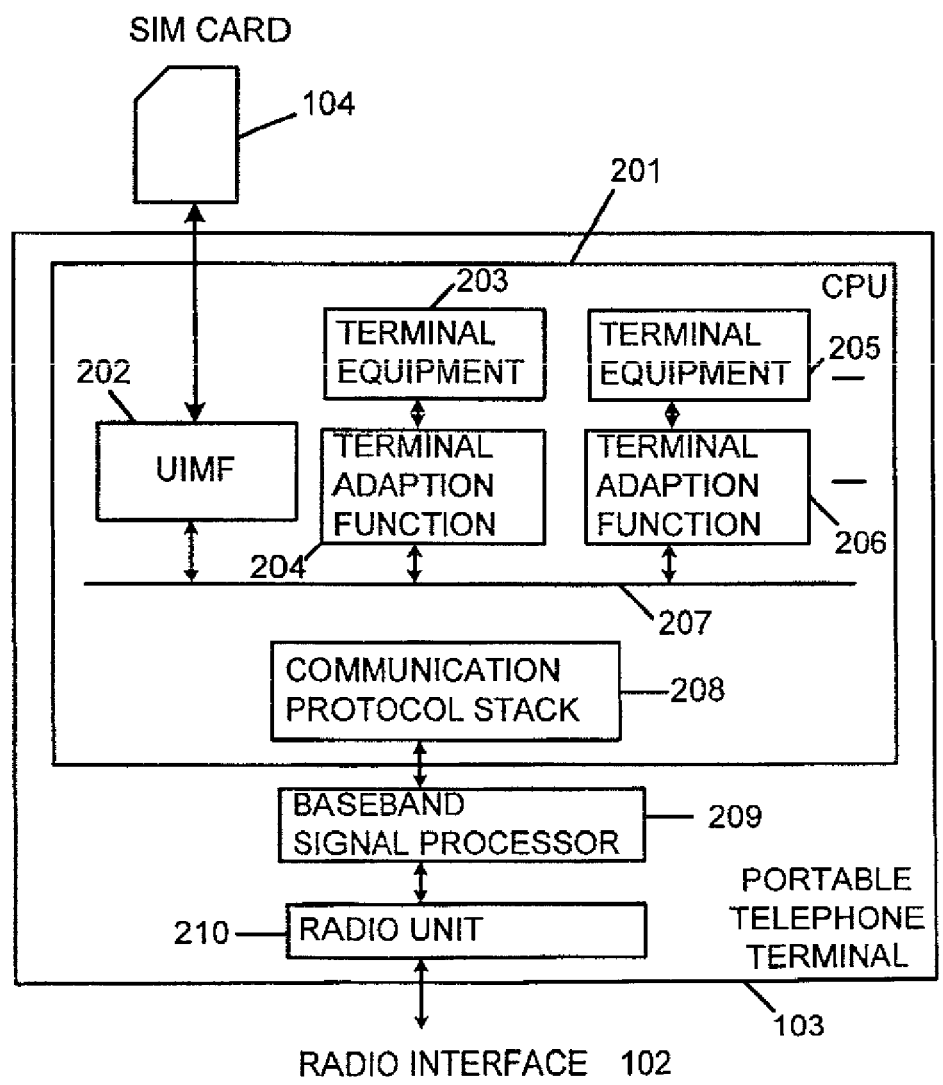
FIG. 5 is a block diagram showing the construction of a portable telephone terminal in an embodiment of the present invention.

FIG. 5 shows an example of the internal configuration of portable telephone terminal 103. As shown in FIG. 5 portable telephone terminal 103 comprises radio unit 210 for performing signal processing with radio interface 102 on the physical layer, baseband signal processor 209, and CPU 201.

Communication protocol stack 208 for executing communication protocol control with base station 101 is mounted on CPU 201. In addition, TE (Terminal Equipment) 203 and 205 for realizing applications and user interfaces and triggering call origination and call connection, and TAF (Terminal Adaptation Functions) 204 and 206 for converting protocol between communication protocol stack 208 and TE 203 and 205 are also mounted on CPU 201. Still further, logical bus 207 is mounted for realizing communication between TAF 204 and 206 and communication protocol stack 208, and these constituent elements are mounted and operate as software modules.

As shown in FIG. 5, UIMF (User Identity Module Function) 202 is connected to logical bus 207. SIM card 104 and CPU 201 communicate by means of this UIMF 202. In accordance with commands from SIM card 104, UIMF 202 acquires protocol messages and internal information that flow on logical bus 207 and transfers these messages and information to SIM card 104. UIMF 202 also sends protocol messages to communication protocol stack 208 by way of logical bus 207 in accordance with commands from SIM card 104.

When UIMF 202 communicates with communication protocol stack 208 by way of logical bus 207, the protocol messages that are transmitted by this UIMF 202 are equivalent to messages that are transmitted from TAF 204 or TAF 206 from the viewpoint of communication protocol stack 208. As a result, the same processing can be performed when call origination or call connection is activated artificially from SIM card 104 as when receiving messages that are transmitted from TAF 204 or TAF 206.

Figure 6:
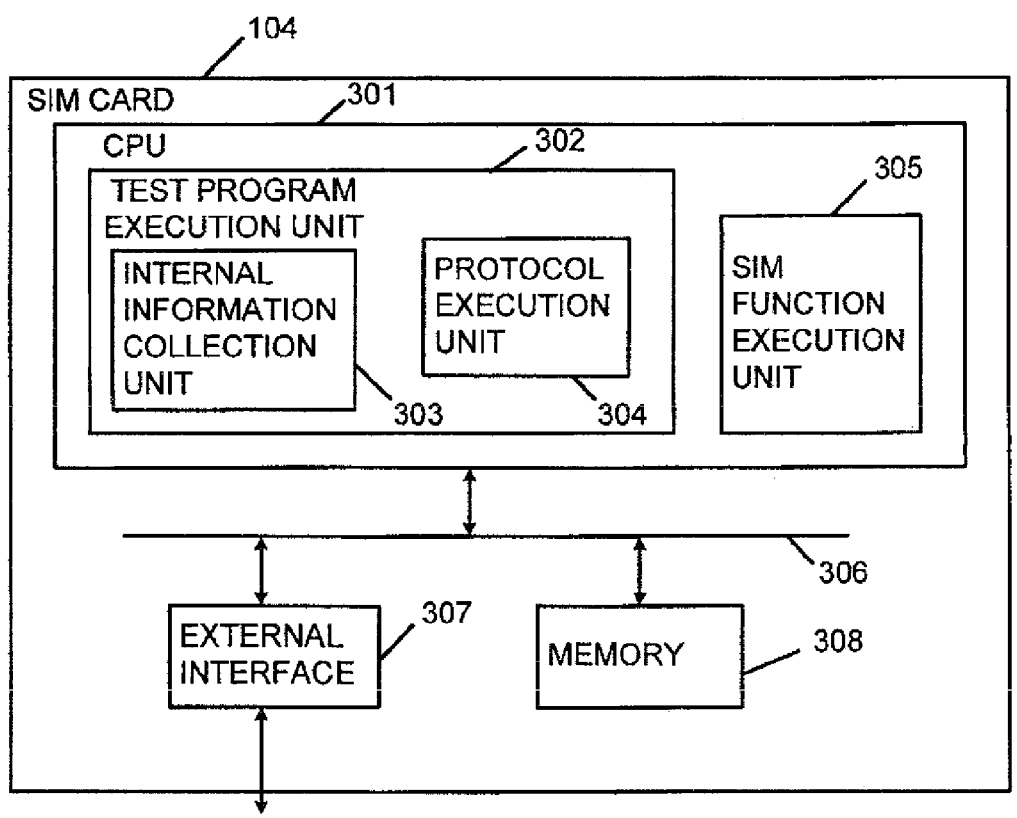
FIG. 6 is a block diagram showing an example of the construction of a SIM card according to an embodiment of the present invention.

FIG. 6 shows an example of the internal configuration of SIM card 104. SIM card 104 comprises CPU 301, memory 308, external interface 307 and internal bus 306 for realizing communication between CPU 301 and memory 308 or external interface 307.

In CPU 301, a program to execute SIM functions of the prior art such as transmitting subscriber information/user information and operator information to portable telephone terminal 103 is executed in SIM function execution unit 305. Further, a test program that is executed for performing field tests is executed by test program execution unit 302 in CPU 301 of this SIM card 104.

Test program execution unit 302 includes internal information collection unit 303 for collecting information relating to the internal state of portable telephone terminal 103 and protocol execution unit 304 for reproducing a communication protocol sequence and artificially executing communication protocol.

Memory 308 of SIM card 104 stores information such as subscriber information/user information and operator information, as with SIM card 104 of the prior art. In this embodiment, memory 308 also stores internal state information of portable telephone terminal 103 and internal information of the interior of portable telephone terminal 103. External interface 307 has the function to realize communication between UIMF 202 in portable telephone terminal 103 and CPU 301.

Internal information collection unit 303 reports the start of monitoring of internal state information to UIMF 202 in portable telephone terminal 103 by way of external interface 307. Internal information collection unit 303 further transmits a command to collect internal state information and begins the collection of internal state information. Protocol execution unit 304 instructs UIMF 202 in portable telephone terminal 103 to reproduce a communication protocol sequence by way of external interface 307 and instructs the transmission of communication protocol from communication protocol stack 208 to base station 101.

Upon receiving from internal information collection unit 303 of SIM card 104 the command to collect internal state information, UIMF 202 of portable telephone terminal 103 acquires internal state information that flows on logical bus 207. The internal state information acquired by UIMF 202 is transferred to internal information collection unit 303, and transferred from internal information collection unit 303 to memory 308, and stored. Internal information collection unit 303 is capable of both storing this internal state information in memory 308 and executing a process of reading stored internal state information to the outside in accordance with instructions from, for example, portable telephone terminal 103.

When reproducing a communication protocol sequence in a field test, protocol execution unit 304 reads the protocol message, which is the internal state information stored in memory 308. Protocol execution unit 304 then reports the start of a reproduction test of communication protocol to UIMF 202 in portable telephone terminal 103 by way of external interface 307. In addition, protocol execution unit 304 transmits the protocol message stored in memory 308 to UIMF 202. Upon receiving the notification of the start of a reproduction test, UIMF 202 transfers the protocol message to communication protocol stack 208, whereby a past communication protocol sequence is artificially reproduced. It is also possible for the reproduction of a communication protocol sequence that is carried out by protocol execution unit 304 to be performed as a parallel operation with the collection of internal state information that is carried out by internal information collection unit 303.

The following explanation describes the operations of portable telephone terminal 103 and SIM card 104 when carrying out a field test in the present embodiment. In a field test in the present embodiment, a call origination operation test is carried out for testing the call origination operation of portable telephone terminal 103. A reproduction test of the communication protocol sequence that is carried out in the call origination operation test is then performed.

Figure 7:
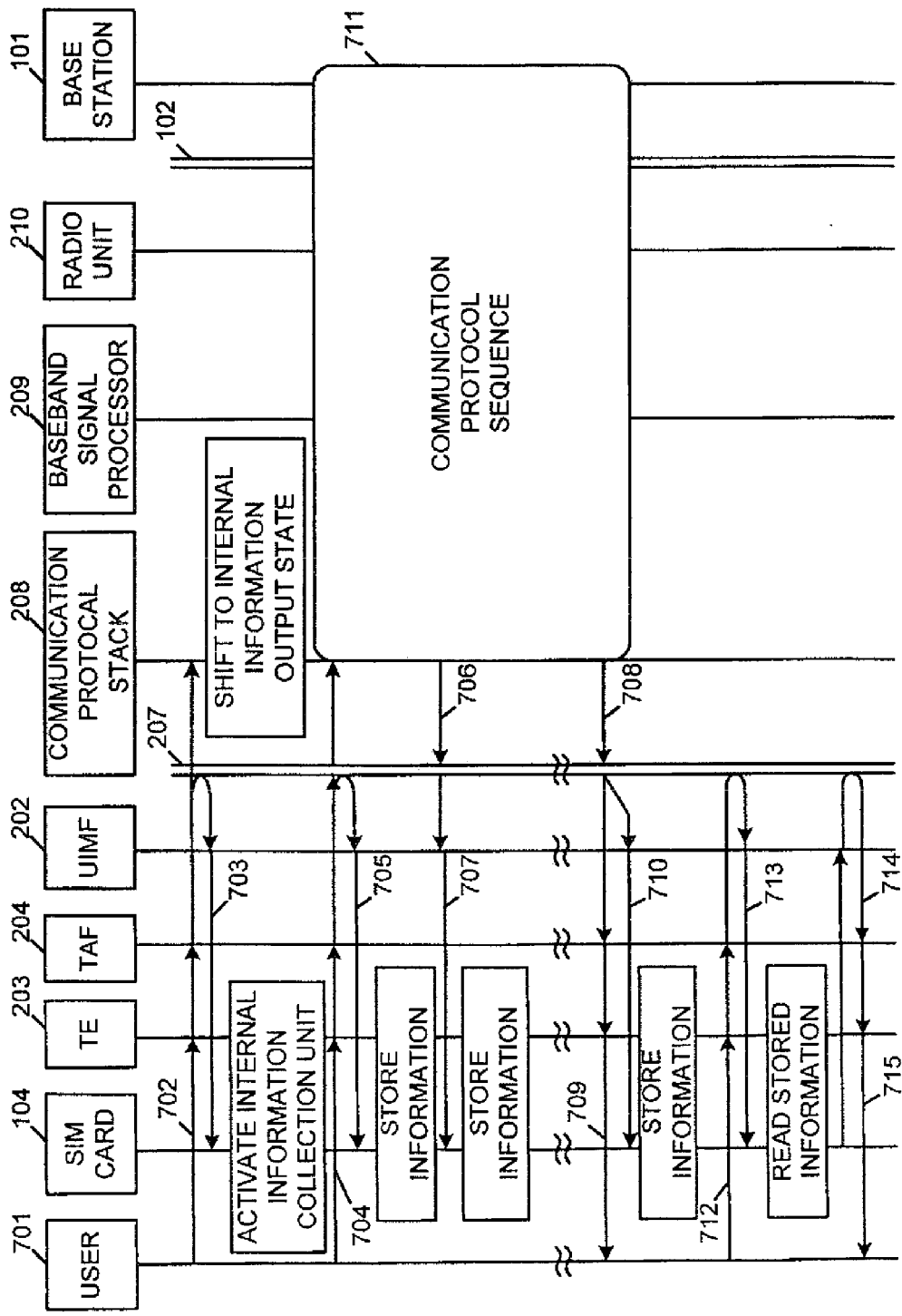
FIG. 7 is a sequence diagram showing the operation in a communication test according to an embodiment of the present invention.

The call origination operation test of portable telephone terminal 103 will be explained with reference to FIG. 7. FIG. 7 is a sequence chart showing the operations in the call origination operation test of portable telephone terminal 103.

In FIG. 7, portable telephone terminal 103 is first set to the test mode by user 701 (the tester), whereby test mode request 702 is conferred to TE 203 from user (tester) 701. Test mode request 702 that has been conferred to TE 203 accordingly undergoes protocol conversion at TAF 204 and is then transferred to communication protocol stack 208 by way of logical bus 207. Communication protocol stack 208 receives this test mode request 702 and thus shifts to a state that allows output of internal state information and protocol messages onto logical bus 207.

Test mode request 702 is both sent to communication protocol stack 208 and transferred to UIMF 202 by way of logical bus 207. When UIMF 202 accordingly detects this test mode request 702, it reports test mode set-up request 703 to SIM card 104.

Upon receiving test mode set-up request 703, SIM card 104 activates internal information collection unit 303 in test program execution unit 302 and enters a state of waiting for information from portable telephone terminal 103.

As shown in FIG. 7, when user (tester) 701 confers call origination request 704 to TE 203, TE 203 causes TAF 204 to convert the protocol of call origination request 704, whereby TAF 204 performs protocol conversion and then transfers call origination request 704 to communication protocol stack 208 by way of logical bus 207. Communication protocol stack 208, upon receiving this call origination request 704, exercises control over baseband signal processor 209 and radio unit 210 to execute communication protocol sequence 711 with base station 101.

At the same time, UIMF 202 acquires protocol messages relating to call origination request 704 that flow on logical bus 207 and reports to SIM card 104 information storage request 705 for call origination request 704. SIM card 104, upon receiving information storage request 705, stores call origination request 704 in memory 308 in SIM card 104 by means of internal information collection unit 303.

Communication protocol stack 208, which executes communication protocol sequence 711, supplies parameters that indicate the internal operation states that occur in the process of communication protocol sequence 711 to logical bus 207 as internal state information 706.

UIMF 202 acquires internal state information 706 that flow on logical bus 207, and reports information storage request 707 for internal state information 706 to SIM card 104. SIM card 104, upon receiving information storage request 707, stores internal state information 706 in memory 308 inside SIM card 104 by means of internal information collection unit 303.

As shown in FIG. 7, communication protocol stack 208 supplies protocol messages 708 that are generated in the process of communication protocol sequence 711 to logical bus 207. These protocol messages 708 include, for example, a call origination response message that indicates a response to call origination request 704 from user 701.

UIMF 202 acquires protocol messages 708 by way of logical bus 207 and reports information storage request 710 for these protocol messages 708 to SIM card 104. SIM card 104, upon receiving information storage request 710, stores protocol messages 708 in memory 308 in SIM card 104 by means of internal information collection unit 303.

Protocol messages 708 are also transferred in the order of TAF 204 and TE 203. Protocol messages 708 are then conveyed to user 701 as call origination response 709 for call origination request 704 that was conferred by user 701. Call origination response 709 at this time is displayed on, for example, the display unit of portable telephone terminal 103 and thus recognized by user 701.

Call origination request 704, internal state information 706, and protocol messages 708 that are generated in the course of communication protocol sequence 711 are thus stored in memory 308 of SIM card 104 when user 701 confers call origination request 704. This stored information is then recognized by user 701.

User 701, having recognized call origination response 709, gives TE 203 internal information read request 712 to read internal state information that has been stored in SIM card 104, whereby TE 203 sends internal information read request 712 to TAF 204. Internal information read request 712 that has undergone protocol conversion at TAF 204 is transferred to UIMF 202 by way of logical bus 207. Accompanied with this transfer, UIMF 202 reports information read request 713 to SIM 104.

SIM card 104, reads information data that have been stored in memory 308 and reports these data to UIMF 202 as information read response 714. UIMF 202 reports internal information read response 715 to user 701 by the route: logical bus 207, TAF 204, and TB 203.

In the call origination operation test shown in FIG. 7, a case in which internal state information and protocol messages are transmitted and received one item at a time was explained, but a plurality of items of information or messages may also be transmitted and received simultaneously.

Figure 8:
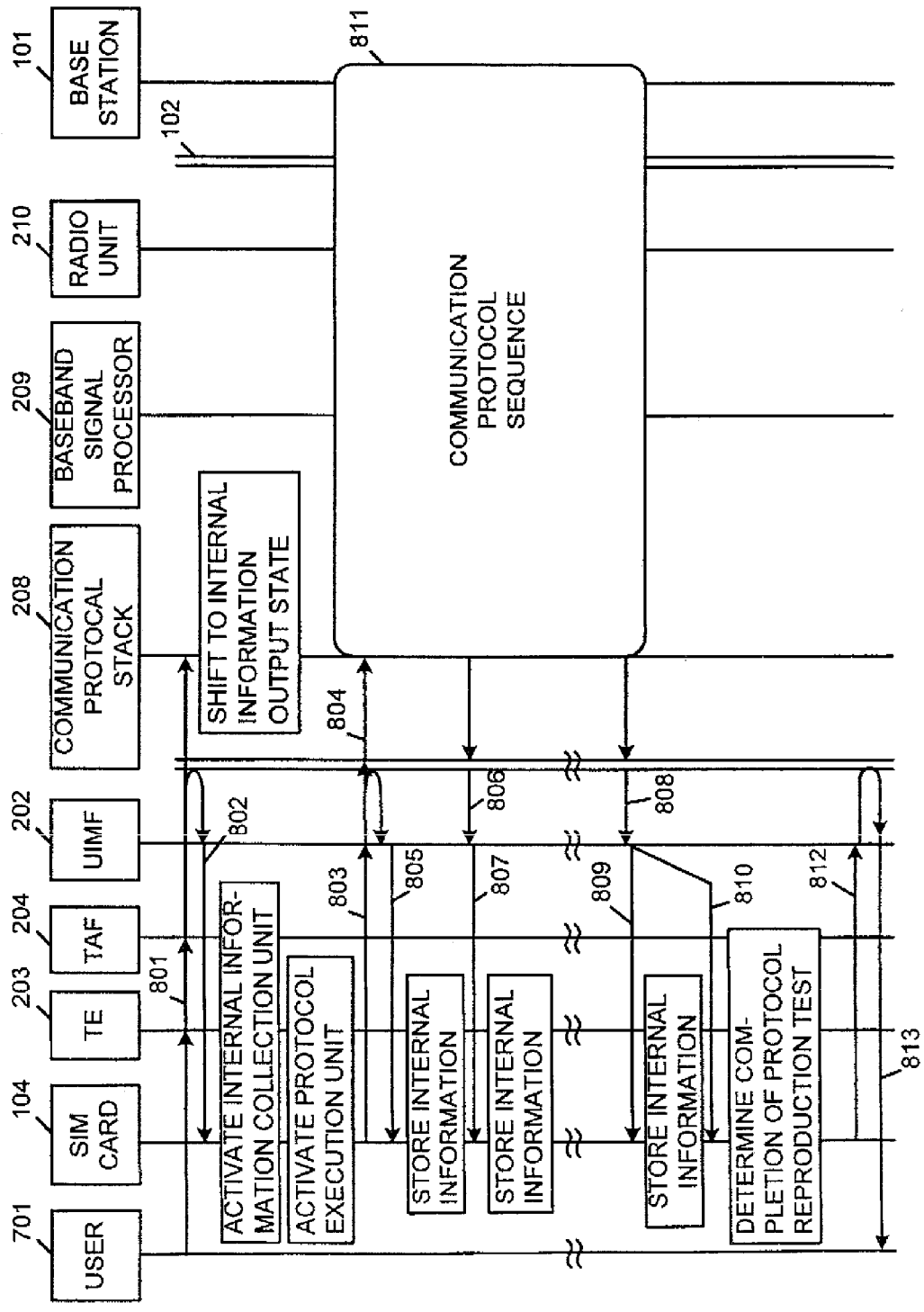
FIG. 8 is a sequence diagram showing the operation in a reproduction test according to an embodiment of the present invention.

The communication protocol sequence reproduction test will be explained with reference to FIG. 8 that is carried out based on internal state information that has been collected during a call origination operation test. FIG. 8 is a sequence diagram showing the operations in the reproduction test of portable telephone terminal 103.

In FIG. 8, portable telephone terminal 103 is first set to the test mode of the reproduction test by user 701, whereby test mode request 801 for a protocol reproduction test is conferred from user 701 to TE 203. Test mode request 801 that has been accordingly conferred to TE 203 undergoes protocol conversion by TAF 204 and then is transferred to communication protocol stack 208 by way of logical bus 207. Communication protocol stack 208, having received this test mode request 801, shifts to a state that allows output of internal state information and protocol messages to logical bus 207.

Test mode request 801 is both sent to communication protocol stack 208 and transferred to UIMF 202 by way of logical bus 207, whereby UIMF 202, upon detecting this test mode request 801, reports test mode set-up request 802 that relates to the protocol reproduction test to SIM card 104.

SIM card 104, having received this test mode set-up request 802, activates internal information collection unit 303 in test program execution unit 302 and enters a state of waiting for information from portable telephone terminal 103.

Next, as shown in FIG. 8, protocol execution unit 304 in test program execution unit 302 is activated, and internal information collection unit 303 shifts from the state of waiting for information to the activated state. Protocol execution unit 304 reads the internal state information such as the call origination request, internal state information, and protocol messages that have been stored in memory 308 as the result of the preceding call origination operation test and generates simulated call origination request 803. Protocol execution unit 304 automatically reports this simulated call origination request 803 to UIMF 202.

UIMF 202, upon receiving simulated call origination request 803, reports call origination request 804 to communication protocol stack 208. Communication protocol stack 208, having received this simulated call origination request 803, control baseband signal processor 209 and radio unit 210 to execute communication protocol sequence 811 with base station 101.

UIMF 202 also acquires protocol messages relating to call origination request 804 that flow on logical bus 207, and reports information storage request 805 for call origination request 804 to SIM card 104. SIM card 104, upon receiving information storage request 805, stores call origination request 804 in memory 308 in SIM card 104 by means of internal information collection unit 303.

Communication protocol stack 208, which executes communication protocol sequence 811, supplies parameters that indicate the internal operation states that occur in the process of communication protocol sequence 811 to logical bus 207 as internal state information 806.

UIMF 202 acquires internal state information 806 that flows in logical bus 207, and reports information storage request 807 for internal state information 806 to SIM card 104. SIM card 104, upon receiving information storage request 807, stores internal state information 806 in memory 308 in SIM card 104 by means of internal information collection unit 303.

In addition, as shown in FIG. 8, communication protocol stack 208 supplies protocol messages 808 that are generated in the process of communication protocol sequence 811 to logical bus 207. These protocol messages 808 include, for example, a call origination response message that indicates a response to simulated call origination request 803 from protocol execution unit 304.

UIMF 202 acquires protocol messages 808 by way of logical bus 207, and reports information storage request 809 for these protocol messages 808 to SIM card 104. Upon receiving information storage request 809, SIM card 104 stores protocol messages 808 in memory 308 in SIM card 104 by means of internal information collection unit 303.

UIMF 202 also reports to SIM card 104 received protocol messages 808 as simulated protocol messages 810. SIM card 104 determines the completion of the protocol reproduction test based on the message content of simulated protocol messages 810. If the conditions for completion of the protocol reproduction test are satisfied, protocol execution unit 304 in SIM card 104 reports simulation sequence completion report 812 to UIMF 202. UIMF 202 reports protocol reproduction test completion report 813 to user 701 by the route: logical bus 207, TAF 204, and TE 203.

Finally, another example of the SIM card in the present embodiment will be explained. FIG. 9 shows an example of the internal configuration of SIM card 104a. SIM card 104a in the present embodiment includes, in CPU 301a, a SIM function execution unit 305 and test program execution unit 302a as its basic constituent elements. Test program execution unit 302a includes internal information collection unit 303 and protocol execution unit 304. In addition, in another example of SIM card 104a, test program execution unit 302a is provided with stored information processor 310 as shown in FIG. 9.

Stored information processor 310 has the function to process information that is stored in memory 308a. When testing call origination operations, protocol reproduction information 309 such as parameters and protocol messages that are necessary when protocol execution unit 304 executes a simulated protocol sequence are stored in advance in memory 308a, as shown in FIG. 9.

For example, when information such as internal state information 706 and protocol messages 708 that were stored when testing call origination operation is stored as protocol reproduction information 309 in memory 308a, protocol reproduction information 309 can be processed when protocol execution unit 304 artificially executes communication protocol sequence 711 to carry out a protocol reproduction test. In this way, for example, parameters that are necessary when protocol execution unit 304 artificially executes a communication protocol sequence can be modified, and a different protocol reproduction test can thus be executed in the process of the protocol reproduction test.

Information that has been processed in this way by stored information processor 310 is stored in memory 308a as protocol reproduction information 309. At this time, modified protocol reproduction information 309 may be saved by overwriting protocol reproduction information 309, or may be saved separately from original protocol reproduction information 309 in memory 308a. Protocol execution, unit 304 then reads protocol reproduction information 309 that is stored in memory 308a and artificially executes the communication protocol sequence by the same procedure as shown in FIG. 7 and FIG. 8.

When modified protocol reproduction information 309 is saved separately from original protocol reproduction information 309, both the original protocol reproduction test and a different protocol reproduction test can be carried out. These different protocol reproduction tests can be compared and a comparative examination of each protocol reproduction test can be carried out. For example, if a problem occurred when carrying out a call origination operation test, predetermined parameters of protocol reproduction information 309 can be modified and a protocol reproduction test relating to a different base station then performed. This approach enables an investigation into whether the problem that occurred in the call origination operation test was caused by the base station or caused by the portable telephone terminal. Furthermore, parameters can also be modified to carry out protocol reproduction tests for all surrounding base stations and thus carry out a comparative investigation to determine whether the problem was due to radiowave interference at the test location.

The components of SIM card 104a such as internal information collection unit 303, protocol execution unit 304, SIM function execution unit 305, and external interface 307 each perform the same operations as in previously described SIM card 104, and redundant explanation of these operations is therefore here omitted.

Any protocol reproduction information 309 that is required for simulating the communication protocol sequence in SIM card 104a can be stored in advance in SIM card 104a when carrying out protocol reproduction tests, and testing of communication protocol sequence is therefore possible in a stage of development of portable telephone terminal 103 in any pattern.

In particular, a simulated reproduction test of protocol simulates the action of host software such as TE and TAF. Components can therefore be tested in isolation on the radio interface (below the communication protocol stack) side prior to completion of the higher-order software, and similarly, can be efficiently tested after combination of the higher-level software.

As previously explained, SIM card 104 in the present embodiment can collect and save internal state information of portable telephone terminal 103 in the normal-use of portable telephone terminal 103 and SIM card 104. Thus, in the event of a problem that occurs during actual use by an end user, the internal state information at the time the problem occurs can be stored and saved in memory 308 of SIM card 104. In this way, the service provider or manufacturer of the terminal can read the stored information of SIM card 104 and efficiently analyze the problem.

SIM card 104 is also capable of collecting and saving the internal state information of portable telephone terminal 103, and in a field test performed by the service provider or manufacture of the terminal, the field test can therefore be carried out without having to employ equipment (such as a personal computer or test software) for acquiring internal state information.

A field test that uses SIM card 104 in the present embodiment therefore features superior portability and maneuverability, and field tests can therefore be easily realized on portable telephone terminal 103, which is the smallest unit of equipment.

Furthermore, the use of SIM card 104 in the present embodiment enables reproduction tests in which communication protocol is artificially reproduced based on the information that is acquired and stored by SIM card 104. As a result, the conditions in which a problem occurred outside the laboratory during field experimentation can be easily reproduced with laboratory accuracy, and moreover, can be efficiently improved with laboratory accuracy.

In SIM card 104 in the present embodiment, not only is internal state information stored in SIM card 104, but a simulation reproduction test means that was provided in equipment (such as a personal computer and test software) for reproduction tests in the prior art is also stored in SIM card 104. Thus, inserting this SIM card 104 in which information such as internal state information has been stored into another terminal and carrying out a reproduction test enables an easy determination of whether a problem is peculiar to a particular terminal.

In SIM card 104 in the present embodiment, moreover, the internal state information of portable telephone terminal 103 is stored in SIM card 104, and as a result, internal state information regarding a problem that has occurred when a user is using portable telephone terminal 103 can be acquired in a real-time fashion when the problem occurs.

Still further, the conditions at the time a problem occurs can be reliably reproduced by the protocol execution unit based on internal state information that has been stored in SIM card 104, and the source of the problem can therefore be quickly investigated. The problem in portable telephone terminal 103 can therefore be efficiently investigated and the problem quickly resolved, and portable telephone terminal 103 can be quickly repaired and returned to the user that owns portable telephone terminal 103.

Although a protocol reproduction test, in which protocol is artificially reproduced by a protocol execution unit, was executed in the SIM card in the present embodiment, the present invention is not limited to protocol reproduction tests, and various protocols can be executed. For example, various protocols including TCP, IP, HTTP, FTP, SMTP, PPP, and PPPOE can be executed. Various types of information can also be stored along with these protocols and the protocols then executed.

If the protocol execution unit executes various protocols, a service can be offered that features a variety of added values. For example, when the protocol execution unit uses SAT or USAT functions to execute HTTP, connection to a network such as the Internet by way of a browser becomes a possibility.

When various protocols are executed in this way, communication for each IC card such as a SIM card or USIM card can be realized regardless of the portable telephone terminal. Services such as a network service can therefore be provided by each IC card to users, and the user is able to use services for each of his or her IC cards.

In addition, the SIM card in the present embodiment can be used to execute not only protocol but also applications that are performed on a portable telephone terminal in the prior art. Accordingly, services such as applications can be offered to users for each IC card such as a SIM card or USIM card regardless of the portable telephone terminal and users can thus use application services such as games.

Finally, the present invention is not limited to a portable telephone terminal, and typical electronic devices may also be connected by a network and SIM cards that are specific to each of a variety of electronic devices may then be set up. In this way, a test of communication network protocol that links electronic devices can be easily carried out as previously described, and a problem in an electronic device or a problem in communication can therefore be efficiently discovered and repaired.

While a preferred embodiment of the present invention has been described using specific terms, such description is for illustrative purposes only, and it is to be understood that changes and variations may be made without departing from the spirit or scope of the following claims.

What is claimed is:

1. An external module for installation into a mobile communication terminal, said external module comprising:
a portable storage device comprising:
a test program execution unit, for testing a communication protocol to make a determination whether said communication protocol is being performed properly during transmission between the mobile communication terminal and a base station, including an internal collection mechanism for communicating with said mobile communication terminal to collect information from said mobile communication terminal relating to an internal state of said mobile communication terminal during execution of the communication protocol during transmission between said mobile communication terminal and said base station, and
a storage mechanism for storing therein stored information that has been collected by said collection mechanism, for utilization by said test program execution unit for said determination.

2. An external module according to claim 1, further comprising:
a protocol execution mechanism for requesting said mobile communication terminal to execute said communication protocol to make a determination whether said communication protocol is being performed properly during transmission between said mobile communication terminal and a base station.

3. An external module according to claim 2, wherein said protocol execution mechanism includes a mechanism for requesting the execution of said communication protocol based on information that has been stored in said storage mechanism relating to the performance of said communication protocol during transmission between said mobile communication terminal and said base station.

4. An external module according to claim 2, wherein said communication protocol is a communication protocol that is performed by radio between a mobile communication terminal and a base station.

5. An external module according to claim 1, further comprising:
a stored information processing mechanism for processing stored information that has been stored in said storage mechanism.

6. An external module according to claim 5, wherein said protocol execution mechanism includes a mechanism for requesting the execution of a communication protocol based on information that has been processed by said stored information processing mechanism.

7. An external module according to claim 1, wherein said external module is any one of a SIM card, a USIM card, and an IC card having higher specifications than a SIM card or USIM card.

8. A mobile communication terminal into which an external module is installed, said mobile communication terminal comprising:
an internal acquisition mechanism for acquiring information, in response to commands from said external module, from said mobile communication terminal relating to an internal state of said mobile communication terminal during execution of a communication protocol to make a determination whether said communication protocol is being performed properly during transmission between said mobile communication terminal and a base station; and
an output mechanism for supplying information that has been acquired by said acquisition mechanism to said external module where the information is stored for use in said determination.

9. A mobile communication system comprising:
a mobile communication terminal; and
an external module for installation into said mobile communication terminal;
wherein said mobile communication terminal comprises:
an internal acquisition mechanism for acquiring information, in response to commands from said external module, from said mobile communication terminal relating to an internal state of said mobile communication terminal during performance of a communication protocol during transmission between said mobile communication terminal and a base station; and
an output mechanism for supplying information that has been acquired by said acquisition mechanism to said external module;
and wherein said external module comprises:
an internal collection mechanism for collecting information from said mobile communication terminal that has been supplied by said output mechanism of said mobile communication terminal; and
a storage mechanism for storing therein information that has been collected by said collection mechanism.

10. A method for testing communication protocol in a mobile communication terminal, an external module being installed into said mobile communication terminal, said method comprising the steps of:
requesting said mobile communication terminal, by said external module, to execute a communication protocol;
executing, by said mobile communication terminal, said communication protocol in accordance with said request by said external module;
internally acquiring, in response to commands from said external module, from said mobile communication terminal, information relating to an internal state of said mobile communication terminal during execution of said communication protocol during transmission between said mobile communication terminal and a base station;
supplying, by said mobile communication terminal, the acquired information to said external module;
collecting, by said external module, information that has been supplied by said mobile communication terminal; and
storing, in said external module, the collected information as stored information.

11. A method according to claim 10, further comprising said external module requesting said mobile communication terminal to execute said communication protocol, and determining whether the execution of said communication protocol during transmission between said mobile communication unit and said base station is proper, based on information that is stored.

12. A method according to claim 10, wherein said step of executing said communication protocol includes execution by said mobile communication terminal of a communication protocol sequence by radio with a base station.

13. A method according to claim 10, further comprising a step of processing information that is stored in said external module.

14. A method according to claim 13, wherein said external module, requests execution of a communication protocol, and determines whether the execution of said communication protocol during transmission between said mobile communication unit and said base station is proper, based on said stored information.

15. A method according to claim 10, wherein said external module is any one of a SIM card, a USIM card, and an IC card having higher specifications than a SIM card or a USIM card.

16. An external module for installation into a mobile communication terminal, said external module comprising:
a portable storage device comprising:
a test program execution unit for performing test programs relating to testing the proper execution of a communication protocol between said mobile communication terminal and a base station during transmission between said mobile communication terminal and said base station;
an internal collection mechanism for communicating with said mobile communication terminal to collect information from said mobile communication terminal relating to an internal state of said mobile communication terminal during execution of said communication protocol during transmission between said mobile communication terminal and said base station; and
a storage mechanism for storing therein stored information that has been collected by said collection mechanism.

17. A mobile communication terminal into which is installed an external module for executing test programs relating to testing the proper execution of a communication protocol between said mobile communication terminal and a base station during transmission between said mobile communication terminal and said base station, said mobile communication terminal comprising:
an internal acquisition mechanism for acquiring, in response to commands from said external module, information from said mobile communication terminal relating to an internal state of said mobile communication terminal during said execution of said communication protocol during transmission between said mobile communication terminal and said base station; and
an output mechanism for supplying information that has been acquired by said acquisition mechanism to said external module where the information is stored and utilized during the execution of said test programs.

18. A mobile communication system comprising:
a mobile communication terminal; and
an external module for installation into said mobile communication terminal;
wherein said mobile communication terminal comprises:
an internal acquisition mechanism for acquiring information, in response to commands from said external module, from said mobile communication terminal relating to an internal state of said mobile communication terminal during execution of a communication protocol during transmission between said mobile communication terminal and a base station; and
an output mechanism for supplying information that has been acquired by said acquisition mechanism to said external module;
and wherein said external module comprises:
a test program execution unit for performing test programs;
a collection mechanism for collecting information from said mobile communication terminal for test programs, relating to testing the proper execution of a communication protocol between said mobile communication terminal and a base station during transmission between said mobile communication terminal and said base station, executing on said test program execution unit that has been supplied by said output mechanism of said mobile communication terminal; and a storage mechanism for storing therein stored information that has been collected by said collection mechanism for utilization during the execution of said test programs.

19. A method for testing the performance of a communication protocol by a mobile communication terminal by executing test programs in said mobile communication terminal, an external module being installed into said mobile communication terminal, said method comprising steps of:

requesting said mobile communication terminal, by said external module, to execute a communication protocol;

executing, by said mobile communication terminal, said communication protocol during transmission between said mobile communication terminal and a base station in accordance with said request by said external module;

internally acquiring, in response to commands from said external module, from said mobile communication terminal, information relating to an internal state of said mobile communication terminal during performance of said communication protocol during transmission between said mobile communication terminal and said base station;

supplying, by said mobile communication terminal, the acquired information to said external module;

collecting, by said external module, information that has been supplied by said mobile communication terminal as part of said test program; and storing, in said external module, the collected information as stored information from during the performance of said communication protocol, for use with said test program to determine if the performance of the communication protocol is proper.

* * * * *

UNITED STATES PATENT AND TRADEMARK OFFICE
CERTIFICATE OF CORRECTION

PATENT NO. : 7,623,856 B2  Page 1 of 1
APPLICATION NO. : 10/632749
DATED : November 24, 2009
INVENTOR(S) : Hiroyuki Azuma It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Twenty-sixth Day of October, 2010

David J. Kappos
*Director of the United States Patent and Trademark Office*